United States Patent [19]

Leep et al.

[11] 4,369,597
[45] Jan. 25, 1983

[54] PELLETIZED MINT MULCH AND METHOD OF MAKING

[75] Inventors: Ronald B. Leep, P.O. Box D, Madras, Oreg. 97741; Stanley A. Kaber, Culver, Oreg.

[73] Assignee: Ronald B. Leep, Madras, Oreg.

[21] Appl. No.: 247,169

[22] Filed: Mar. 24, 1981

[51] Int. Cl.³ .............................................. A01G 1/00
[52] U.S. Cl. ........................................................ 47/9
[58] Field of Search ...................... 47/9, 58, DIG. 10; 71/23–25, 901, 903–904

[56] References Cited

U.S. PATENT DOCUMENTS

| | | |
|---|---|---|
| 2,163,860 | 6/1939 | White .......................................... 47/9 |
| 2,877,599 | 3/1959 | Hebestreet et al. .................. 47/9 X |
| 3,017,720 | 1/1962 | Busch ..................................... 47/58 |
| 3,099,897 | 8/1963 | Letteron . |
| 3,210,173 | 10/1965 | Mozell . |
| 3,269,824 | 8/1966 | Aswell . |
| 3,292,307 | 12/1966 | Finn ........................................ 47/58 |
| 3,307,934 | 3/1967 | Palmer et al. . |
| 3,943,078 | 3/1976 | James . |

Primary Examiner—Robert E. Bagwill
Attorney, Agent, or Firm—Klarquist, Sparkman, Campbell, Leigh, Whinston & Dellett

[57] ABSTRACT

A process for making pelletized mint mulch utilizes the mint plant residue from production of mint oil as a primary feed stock. The mint residue, known as mint slugs, is first dried, chopped, and sifted to remove fine materials from the fibrous or stemmy portions of the mint slugs and to shorten the mint stem fibers to a length predominantly in the one-half to one-inch range. The chopped fibrous portions of the mint slugs are pelletized and the resultant pellets are crumbled. Pelletizing compresses the mint fibers greatly reducing their bulk and crimping them to promote separability. Crumbling fractures the pellets so that they will more readily break apart and absorb water. Crumbled mint mulch is applied to bare soil surfaces in dry form by conventional broadcasting apparatus. The pellets can also be mixed into a slurry form for spray application by a hydro-mulching machine. The organic structure of the pelletized mint mulch contains substantial quantities of nitrogen, phosphorus and potassium which are gradually released during decomposition of the mulch. The pelletized mint stems also contain a natural tackifier to adhere the fibers to the soil surface.

17 Claims, 8 Drawing Figures

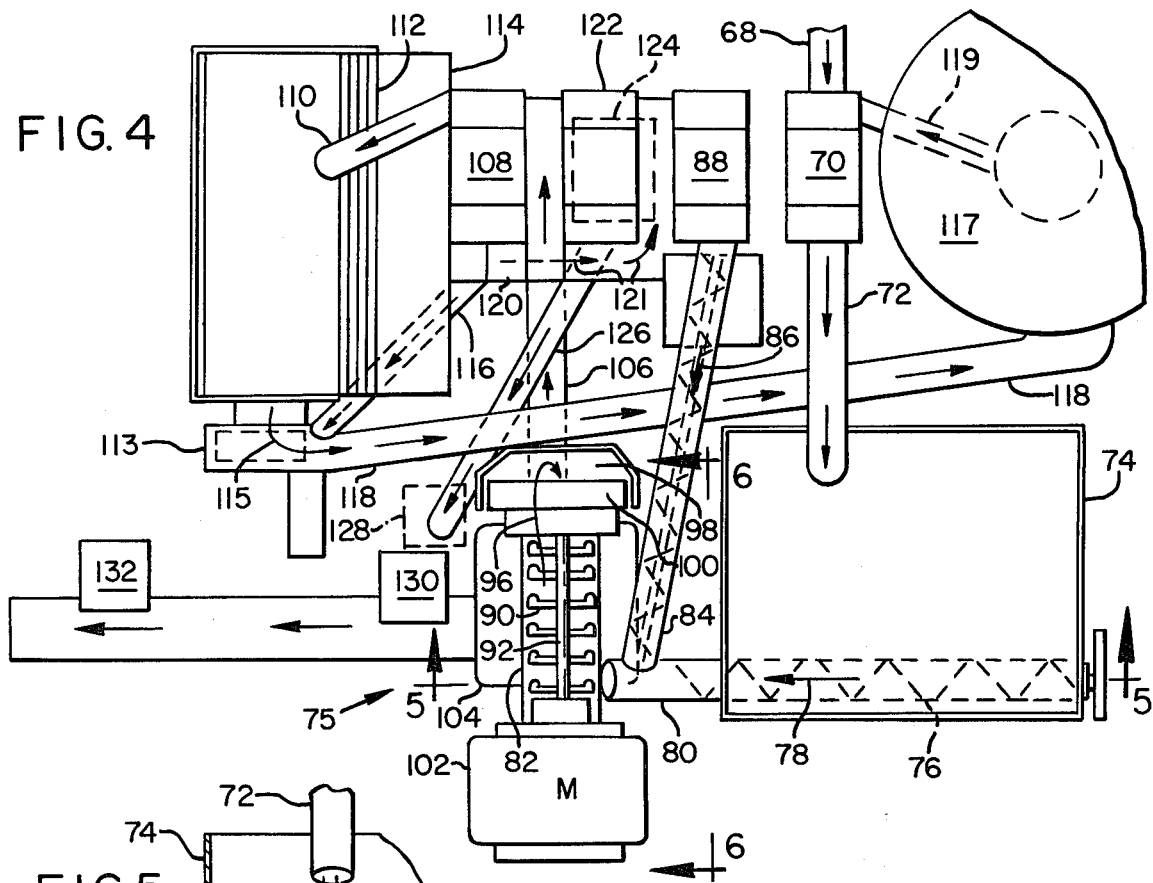
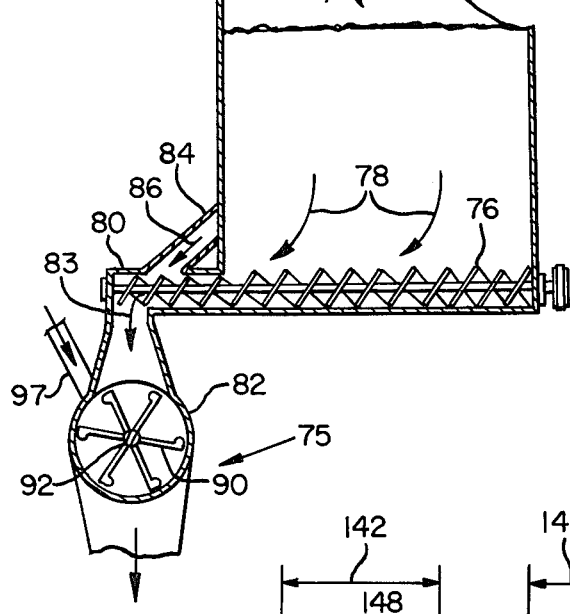
FIG. 4 FIG. 5 FIG. 6 FIG. 7 FIG. 8

PELLETIZED MINT MULCH AND METHOD OF MAKING

BACKGROUND OF THE INVENTION

The invention relates to mulch products of the type that are spread on bare soil surfaces, such as landfills and embankments along new highways, to prevent soil erosion and to encourage the growth of ground cover. The invention also relates to processes for making and applying such mulch products.

Highway embankments, landfills and other areas of bare soil are subject to wind and water erosion. They are also unsightly. Hence, it is desirable to establish a ground cover, such as grass, on the soil surface as soon as possible. Unfortunately, in the course of construction or land filling, any top soil is usually stripped away or covered up. The resultant surface soil is barren, formerly subsurface soil lacking in humous and plant nutrients. The quality of such soil can range from very loose sandy soil which retains water very poorly to heavy clay soil which becomes very hard when dry. To counteract these conditions and promote establishment of a ground cover on the barren soil surfaces, a variety of mulches have been proposed.

U.S. Pat. No. 3,210,173 to Mozell proposes application of an asphaltic emulsion containing salts of fatty acids to promote water retention in barren soil. With the rapidly rising costs of petroleum products, this type of mulch is economically impractical. U.S. Pat. No. 3,943,078 to James discloses a related, latex-based product for use in compacting and stablizing soil for roadbeds and the like, rather than for use as a mulch.

Paper pulp and wood cellulose fibers have long been used as a mulch material. These materials are typically sprayed on the soil surface by a hydro-mulching apparatus in the form of a water slurry to which fertilizers, grass seed and a tackifier have been added. The baled material dries to form a thin fibrous convering over the ground which admits rainwater, yet retains the soil against water and wind erosion. A typical mulch product of this type is SILVA fiber manufactured by Weyerhauser Company, Tacoma, Washington. Such material is delivered to the user packed in large compressed bales. The baled material is compact and intertangled, and so must be manually separated before adding to the slurry in the tank of the hydro-mulching equipment. When wetted, this material hardens, making separation both more necessary and more difficult. Despite careful separation, plugging of the equipment by large globs of undispersed fiber is frequent, necessitating disassembly of the pumping apparatus to remove the plug. When the material is applied in slurry form, smaller globs, too small to plug the machine, are ejected as a part of the spray. The material in such globs fails to disperse adequately on the soil surface. Another problem with this type of mulch material is that it tends to absorb large quantities of nitrate materials during decomposition, thus creating a deficiency of this valuable plant nutrient. Substantial quantities of chemical fertilizer must be added to the slurry to compensate for this loss. However, rainfall or irrigation rapidly leaches out the added chemical fertilizer, leaving the plants with little nutrients to rely on after the first surge of growth. Hence, additional fertilizer should be applied within about a year to sustain vigorous plant growth. A further problem is that the availability of paper pulp and wood cellulose has declined in recent years. The cost of mulch materials has correspondingly increased to the point of economic infeasibility.

Other materials that have been used for mulching bare soil surfaces are grass or straw fiber, particularly the grass screenings left after removal of the grass seed. However, grass and straw fibers are very stiff. They do not disperse well on a soil surface and, thus, do not adequately protect the bare soil from wind and water erosion. Substantial quantities of an artificial tackifier—for example, 30 to 40 pounds of Esi-Tak, manufactured by Environmental Stabilizer International, Inc.—should be added to the slurry to adhere the fibers to the soil. Grass and straw mulches also suffer from all of the above-mentioned drawbacks of wood fiber and paper pulp mulch. Grass fiber has also been pelletized, but no improvement in its soil-holding characteristics was noted. Consequently, governmental agencies have widely disapproved grass fiber as an acceptable mulch material for use on embankments along public highways and on other areas of bare soil under their control.

U.S. Pat. No. 3,099,897 discloses a process for mulching with mica. Finely-divided mica platelets are mixed in a water slurry and sprayed on a bare soil surface and to promote moisture retention. However, mica is a nonrenewable mineral resource and is expensive. While the mica does not take nutrients from the soil, it neither adds nutrients nor prevents the leaching out of chemical fertilizers.

Although not pertinent to the problems of mulching bare soil surfaces, several kinds of soil conditioning and fertilizing compositions have been proposed.

U.S. Pat. No. 3,269,824 to Aswell describes wastepaper soil conditioning and fertilizing pellets which are worked into the soil to aerate and lighten the soil, to promote moisture retention and to slowly release nutrients into the soil. The pellets are an extruded or stamped composition of repulped wastepaper, waste paperboard, fresh wood pulp, pulped bagasse, pulped bark or other pulp cellulose to which has been added a variety of plant nutrients. The pellets are tightly compressed to effectuate a timed release of the added nutrients. Accordingly, they are unsuitable for application as a surface mulch. They are too hard to be distributed dry. They do not absorb water quickly enough to disperse and cover a bare soil surface to form an effective protective mulch thereon. They are likewise too hard to be dissolved quickly enough for mixing in a slurry for spray application, and were never intended to be so applied.

U.S. Pat. No. 3,307,934 to Palmer, et al. describes a method of making a granulated peat fertilizer. In this product, the peat is mixed with chemical fertilizer to reduce the tendency of the fertilizer to scorch the plants before dispersing into the soil. The proportion of peat to inorganic salt is in a range of 20%–60% on a dry weight basis. This product is essentially a fertilizer. It does not contain enough peat to act as an effective surface mulch. The peat is provided in only sufficient quantities to act as a buffer for the chemical fertilizer ingredients.

Accordingly, there remains a need for an effective mulch for application in either wet or dry form to bare soil surfaces to prevent erosion, hold moisture in the soil and not deplete the soil of nutrients or, preferably, contribute nutrients to the soil.

In the process of mint oil extraction, considerable quantities of waste products are generated. In the production of peppermint and spearmint oil, mint hay comprising dried, harvested mint plants, is crushed and steamed to release the oils. Once the oils have been extracted, the processor must somehow dispose of the residual, water-sodden mint plant material, known as mint slugs. Conventionally, the mint slugs are either spread on fields and plowed into the soil or are dried and burned. So far as is known, mint slugs have been considered useless once their oil has been extracted. Hence, it would be desirable to alleviate farmers and mint oil producers of the problems of disposal of mint slugs. It would also be desirable to put the mint slugs to productive use.

SUMMARY OF THE INVENTION

Accordingly, one object of the invention is to utilize the waste products generated in the production of mint oil.

A second object of the invention is to provide an improved mulch for application to bare soil surfaces to promote the growth of ground cover thereon.

Another object of the invention is to provide a mulch product which can be applied either dry, such as by broadcasting, or in liquid form, such as by spraying.

A further object of the invention is to improve the soil-holding characteristics of surface mulches.

An additional object is to avoid the depletion of plant nutrients in the soil due to decomposition of the surface mulch.

Yet another object of the invention is to reduce the cost of soil surface mulches.

To meet the foregoing objects, we have invented a mulch product and a process for making such product which utilizes mint slugs as a feed stock. In a broad aspect of the process for making mint mulch, the mint slugs are dried, chopped, and sifted. These steps provide for the separation of fine materials from the fibrous or stemmy portions of the mint slugs. Removal of fine materials is important for two reasons. First, being quite fine, their soil-holding ability is minimal compared to that of the stemmy portions but, if not removed, add much to the weight and bulk of the mulch. Secondly, such materials help cement the fibrous portions together when baled or pelletized. They thus defeat easy separation and dispersal of the mulch product. The chopping step defiberizes the stems to promote their separability into individual fibers which disperse easily when spread on a soil surface to hold the soil. Chopping also shortens the fibers, preferably to a length predominantly in the one-half to one-inch range, to further enhance their dispersion characteristics. Chopping also prevents plugging of the hydro-mulching apparatus when the mulch is applied in a water slurry form. The organic structure of fibrous portions of the mint slugs contain substantial quantities of nitrogen, phosphorus and potassium, important plant nutrients. Such nutrients are gradually released during decomposition of the mint mulch, which takes about six months to one year. The mint stems also contain a natural tackifier which promotes adherence of the fibers to soil particles on the soil surface. These ingredients are preserved during the processing of the mint mulch and, hence, need not be added to the mulch.

In another important aspect of the invention, the fibrous portions of the mint slugs are pelletized and then, preferably, crumbled. Pelletizing compresses the mint fibers and thereby reduces the bulk of the mulch product to approximately one-third to one-fourth of its unpelletized volume. Pelletizing also stresses or crimps the stemmy fibrous portions of the mint mulch to further promote separability of the fibers. Crumbling fractures the pellets so that they will more readily break apart and absorb water. Crumbled mint mulch pellets of, for example, about one-half inch diameter are readily applied dry by conventional broadcasting apparatus. When wetted, the crumbled pellets expand three or four times in size and quickly disperse under the influence of rainfall or sprinkler irrigation to cover a soil surface area of much greater size than the dimensions of the dry pellets. The pellets are also easily mixed into a slurry form for spray application by a hydro-mulching machine. It is unnecessary to manually tear the fibrous material apart to avoid plugging the machine. The pelletized mint mulch disperses in the slurry within minutes. No large globs of fibrous material remain to plug the machine or to be expelled ineffectually in the spary. Obviously, although the invention is disclosed in the preferred form of sifted, crumbled pellets, chopped stems of mint slugs have utility, without further refinement, as a mint mulch for topical application to barren soil surfaces to prevent erosion and nurture plant growth. Also, in further refining the chopped mint slugs, a suitable mint mulch product may be produced by omitting or varying certain steps of the process, as set forth in the claims.

Pelletized mint mulch has proven effective in a variety of applications. In one particularly severe case, the mint mulch of the invention was applied by hydro mulcher to volcanic ash and mud produced by Mt. St. Helens volcano. A wood fiber based mulch was applied to adjacent areas of ash and mud in the same manner. Both applications included like quantities of grass seed and other additives.

The mint mulch produced a visibly smoother, more uniform surface cover than the wood fiber mulch. Although the wood fiber mulch was applied about 4-5 weeks earlier than the mint mulch, the mint mulch promoted a thicker, faster-growing stand of grass which soon overcame the lead with which the wood fiber-mulched areas started.

The mint mulch has also proven superior to other forms of mulch in preventing wind and water erosion of sand. Despite the minimal use of artificial tackifiers, the mint mulch forms a crust on the sand which effectively precludes the blowing of dust even under very high wind conditions. It also perceptibly firms the surface of the sand from the standpoint of a person walking thereon in contrast to the surface of unmulched sand. These advantages have been quickly recognized by governmental agencies and other prospective users and led to approval of the mint mulch for widespread commercial application.

The foregoing and other objects, features and advantages of the invention will become more apparent from the following detailed description of a preferred embodiment of the invention which proceeds with reference to the accompanying drawings.

BRIEF DESCRIPTION OF THE DRAWINGS

FIG. 4 is a top plan view of apparatus for performing the pelletizing and crumbling steps of the process.

FIG. 5 is a cross-sectional view taken along line 5—5 in FIG. 4.

FIG. 6 is a cross-sectional view taken along line 6—6 in FIG. 4.

FIGS. 7 and 8 are side and end views of a typical mint mulch pellet produced by the system of FIGS. 1-6, the views showing the effects of crumbling to produce fractures and cracks extending at least part way through the pellets to increase their permeability to water and promote their fragmentation.

DETAILED DESCRIPTION OF PREFERRED EMBODIMENT

The mulch of the present invention is produced in the following manner. After extraction of the mint oil, the mint slugs are dumped on a field or other appropriate surface and allowed to air dry for approximately two months, until their moisture content is 15%-25%. If desired, the mint slugs can be dried more quickly in a commercial dryer. After drying, the mint slugs are removed from the field or dryer and hauled to the processing plant illustrated in FIGS. 1-6.

Figure 1:
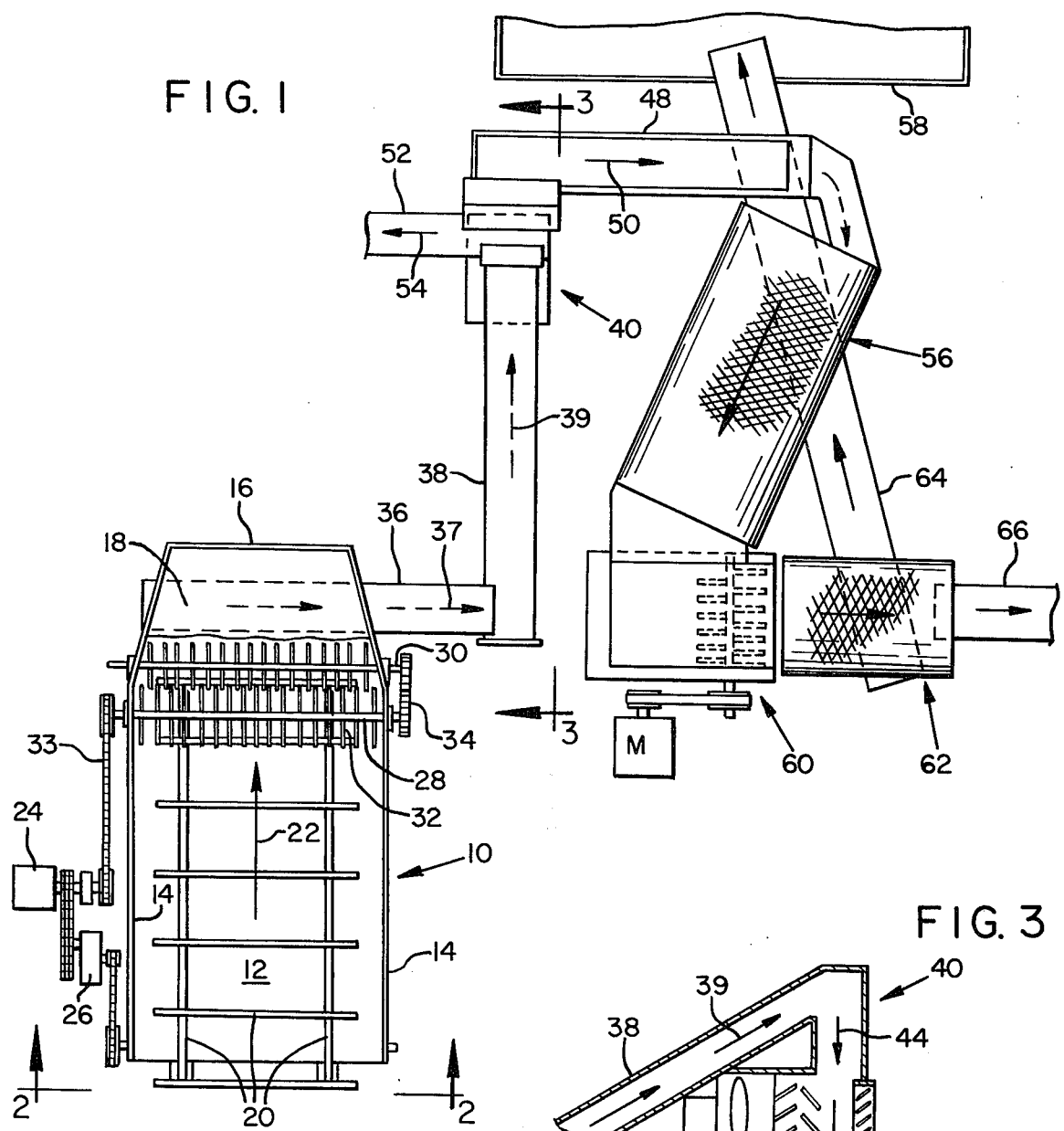
FIG. 1 is a top view of apparatus for performing the chopping and sifting steps of the process of making mint mulch in accordance with the invention.
Figure 2:
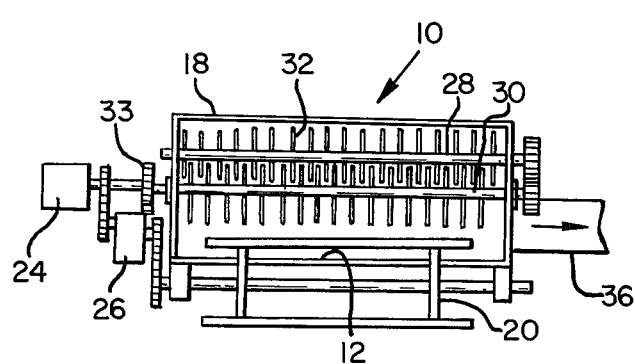
FIG. 2 is a front elevational view of infeed apparatus taken along line 2—2 in FIG. 1.

The mint slugs are dumped onto a live bottom feeder 10, shown in FIGS. 1 and 2. The live bottom feeder's structure generally resembles a conventional field manure spreader. Its principal function is to break up any large chunks of mint slugs. The feeder comprises a large box-like structure having a floor 12 and sidewalls 14. The feeder is open at an infeed end and enclosed by an end wall 16 at its opposite outfeed end. A cover or top wall 18 extends over about one-third of its length from the end wall. A double chain-type ladder conveyor 20 circulates along the bed of the feeder in an infeed direction indicated by arrow 22. This conveyor is driven by motor 24 through a 1,200 to 1 reduction gear drive 26. A pair of parallel shafts 28, 30 are mounted under top wall 18 and extend across the width of floor 12. Spring steel tines 32 are mounted in outwardly radiating fashion on the shafts. The shafts, interconnected by the chain drive 34, are rotated at high speed by motor 24 through a pulley 33. Shaft 28 is positioned above shaft 30 and nearer the infeed of the feeder than shaft 30.

Figure 3:
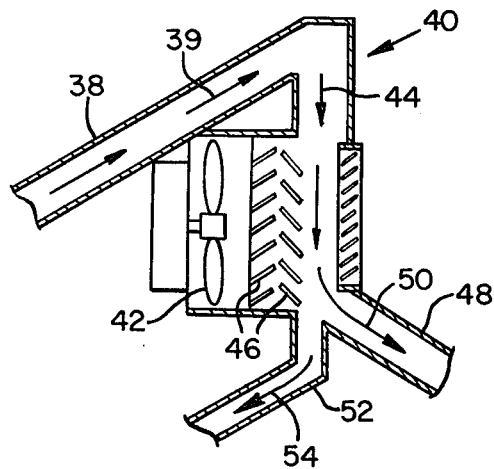
FIG. 3 is a cross-sectional view of air-sifting apparatus taken along line 3—3 in FIG. 1.

A transverse feed auger 36 is connected to the outfeed side of the feeder. Auger 36 conveys the mint slugs in the direction of arrow 37 to an elevator 38 which carries the slugs to the top infeed of an air separator 40, as indicated by arrow 39 in FIGS. 1 and 3. The function of the air separator is to remove rocks and other tramp material from the mint slugs. Referring to FIG. 3, the air separator comprises a fan 42 blowing air horizontally through the downwardly-falling stream of material indicated by arrow 44. A vertical array of louvers 46 can be adjusted to control the velocity of the air passing through the falling material. Being lighter than the rocks and tramp material, the mint slugs are pushed by the air toward a conduit 48 as indicated by arrow 50. The rocks and tramp material fall downwardly to conduit 52, as indicated by arrow 54, and are carried away for disposal.

Conduit 48 drops the mint slugs into the infeed end of a large squirrel cage-type sifter 56. Sifter 56 is a rotating cylindrical drum of 20 to 40 mesh screen. Fine materials, such as ash, sand and broken leafy particles of the mint plant, are sifted out, leaving behind a mint slug fraction which predominantly consists of the stemmy or fibrous portions of mint plants. The fines are collected and transferred by means of a conduit 64 to a collector bin 58.

From the large squirrel shifter, the fibrous fraction of the mint slugs is transferred to a hammermill type chopper 60. The hammermill is adjusted to chop the mint stems and fibers to approximately one inch or less in length. Operation of the hammermill also crushes the stems and tends to break apart the fibers so that they will more easily separate when applied to the soil. At the output of the hammermill, the stemmy or fibrous portions are predominantly in the one-half to one-inch range.

As an alternative to a hammermill, the chopping or defibrizing step could be performed by a trition or finishing mill. The fibers can range in length from 1/32 to 2 inches. However, most of the fiber should exceed one-half inch in length for optimum erosion control. Maximum fiber length is adjusted to pellet size. For one-half inch pellets, most of the mint stems should be less than one-inch long.

During the chopping step, additional fine materials are broken loose from the stemmy portions of the mint slugs. Therefore, the chopped mint slugs are sifted for a second time in a small squirrel cage sifter 62. Sifter 62 is provided with 20 to 40 mesh screen. The fine materials are collected and transferred via conduit 64 to collector bin 58 for use as potting soil. The remaining stemmy or fibrous fraction of the mint slugs is transferred by elevator 66 to a temporary storage bin (not shown).

Referring to FIG. 4, an auger conveyor 68 transfers the stemmy fraction of mint slugs from temporary storage to a bucket elevator 78. The bucket elevator carries such material up to a conduit 72 which dumps them into a generally V-shaped feed bin or hopper 74 of a pelletizer 75. A suitable pelletizer is a 100 horsepower livestock feed pelletizer manufactured by California Pellet Mill Corp., modified to accommodate mint fiber which is much denser and more viscous than livestock feed materials. At the base of the hopper is a motor-driven auger 76 which feeds the mint fiber material horizontally, as indicated by arrows 78, into a short section of infeed conduit 80. The bin wall 77 bulged laterally outwardly just above auger 76 to promote the downward flow of the mint fiber material. From the infeed conduit, the fibrous material drops into a pellet mill mixing chamber 82. As indicated by arrow 82 in FIGS. 5 and 6, a small metering auger 84 is connected to conduit section 80 adjacent hopper 74 for metering additives into the stream of mint fiber material before it drops into the pellet mill mixing chamber, as indicated by arrow 86. These additives are fed into auger 84 from a second bucket elevator 88. Preferably, a mold inhibitor is added to improve the storability of the mulch product. A tackifier, such as Esi-Tak, can be added to the mixture prior to pelletizing, but is ordinarily unnecessary because of the presence of adequate quantities of natural tackifier in the mint stems. Preferably, less than 5-6 pounds of Esi-Tak are added to a ton of mint fiber.

Mounted on a rotating shaft 92 extending the length of the mixing chamber, a series of rotary beaters 90 mix the additives and mint fiber material together. At the same time, they propel the material horizontally toward the opposite end of the mixing chamber as indicated by arrow 94 in FIG. 6. Connected to the top of the pelletizer mixing chamber is a steam infeed pipe 97 for injecting hot steam into the materials in the mixing chamber. The steam helps disperse the additives more evenly through the material, to sterilize any noxious plant seeds, to kill off natural molds and to adjust the moisture of the finished product.

The material is then forced downwardly, as indicated by arrow 96, to a short infeed auger 99 added to the pelletizer on the infeed side of its pelletizing extrusion die 100. To force the material through the die, the pelletizer is driven by a motor 102 through a gear reduction box 104. The motor also drives shaft 92 through a pulley 103. Preferably, the extrusion die 100 is provided with one-half inch extrusion openings to produce approximately one-half inch diameter pellets. The pelletizer includes a wiper arm (not shown) on its outfeed side for breaking the extrusions off in 1 to 1½ inch long pellets. The pellets are then discharged from the pelletizer into conduit 106.

Referring back to FIG. 4, the pellets, which are quite hot, are transferred by conduit 106 to a third bucket elevator 108, which elevates the pellets and discharges them through conduit 110 into the top of a conventional pellet cooling apparatus 112. A fan 113 draws ambient air through the cooler to cool the pellets. This flow of air, indicated by arrow 115, picks up dust and fine unpelletized material as it passes through the cooler. From the bottom end of the cooler, the pellets drop onto a screen shaker 114 for sifting out additional unpelletized fiber material. The dust and upelletized material from the cooler and the shaker is carried by conduits 116, 118 back to a cyclone separator 117, separated from the air and fed into the first bucket elevator 70 for recycling.

The cooled pellets are carried by conveyor 120 to a fourth bucket elevator 122, as indicated by arrows 121. This bucket elevator carries the pellets to an overhead conventional livestock feed crumbler 124, shown in dashed lines for purposes of clarity. The crumbler is adjusted to somewhat crush the pellets without necessarily breaking them apart as is normally done in the manufacture of livestock feed. Crumbling in this manner tends to somewhat flatten the pellets to an oval cross section and to introduce fractures in their structure, as described hereinafter with reference to FIGS. 7 and 8. After crumbling, the pellets flow through conduit 126 to bulk storage 128, also shown in dashed lines. From bulk storage, the pellets are transferred to a bagger and scales station 130 for bagging and weighing. Finally, the bags are transferred to a sewing machine 132 for closure.

Pelletized Mint Mulch Product

Referring to FIGS. 7 and 8, a typical pelletized mint mulch pellet 140 has a length indicated by arrow 142 of about one inch. The preferred length of such pellets is predominantly in the one-half to one and one-quarter inch range, but can be somewhat shorter or longer. Typical cross-sectional dimensions for the pellets are a width 144 of approximately one-half inch and a breadth 146 of about five-eighths inch. This oval cross section results from the crumbling operation, since the pellets are initially formed in a circular cylindrical shape. Also, as a result of the crumbling operation, as well as the largely fibrous content of the pelletized mulch, the pellets are characterized by numerous fracture lines or fissures 148. These fissures make the pellets more readily breakable into shorter pieces and readily admit water into their interior. The absence of large proportions of fine materials also promote breakability and permeability to water. The flattened sides of the pellets may also exhibit a surface pattern of grooves 150 left by the crumbler. The typical color of these pellets is a dark olive green, which is obtained without the addition of any dyes. As applied, the mulch appears on a bare soil surface as a very dark soil. It is sufficiently darker than most types of soil that it is easy to see where the mulch has and has not been applied. However, once applied, it provides a natural and an unobtrusive appearance.

Application of Mint Mulch Product

The best way to apply the mint mulch product of the invention to very large surface areas of bare soil is by a hydro-mulching apparatus. One such apparatus is the HYDRO SEEDER manufactured by The Finn Equipment Company of Cincinnati, Ohio. The mint mulch product is added, preferably in pelletized form, to the water tank of the hydro-mulcher in quantities of about ¾ tons per 1,500 gallons of water. This amount is sufficient to spray approximately one acre of soil surface. Beaters in the water tank and external pumps circulate and agitate the water to break the pellets down into a slurry within above five minutes. Grass seed or other ground cover seed is typically added to the slurry. Chemical fertilizer may also be added to the slurry to help get the ground cover off to a quick start. For example, one hundred pounds of chemical fertilizer containing 16% each of nitrate, phosphate and potash and 3% sulfur may be added. These are much smaller quantities of chemical fertilizer than are normally required with wood and grass fiber-based mulches, because the latter do not provide significant plant nutrients to the ground but draw them from the ground during decomposition. No tackifiers need be added to the slurry, as is the case with wood or grass fiber mulches, since the mint pellets already contain sufficient tackifiers.

Once the mulch slurry has been mixed, it is sprayed on the soil surface using a high-pressure pump gun in conventional fashion. Because the mulch quickly disperses in the water, leaving few undispersed lumps or pellets, the slurry is ejected as a fine spray without large globs of undispersed material. As a result, very uniform coverage of the soil surface with mint mulch fibers is obtained. The few remaining lumps disperse soon after application to the soil.

The natural tackifiers in the mint mulch soak about ⅛ to ¼ inch into the soil to bind the mint stems and soil particles to one another. As the mulched surface dries, a water pervious, fiber-covered crust forms on the soil surface, tending to firm such surface. The mint mulch forms a stemmy fibrous layer which clings to the soil surface and shields it from wind and rain to prevent erosion and from the sun to retain moisture. Action of the weather causes the fibers in the mint stems to further separate from one another and to disperse laterally along the soil surface. Being very fine, the mint mulch fibers spread more easily than the fibers of prior mulches to mechanically bind the surface soil particles together.

As the mint mulch fibers begin to decompose, plant nutrients are released into the soil. Such decomposition ordinarily takes six months to one year, effecting a timed release of such nutrients. The mint mulch pellets have a typical N-P-K dry assay of 3-1-4 (3% nitrogen, 1% phosphorus, and 4% potassium). When applied at the rate of one ton per acre, the fertilizer value of the mint mulch is the equivalent of sixty pounds of nitrogen, twenty pounds of phosphorus and eighty pounds of potassium per acre. However, because these nutrients are bound into the organic structure of the mint mulch, rather than in free form as in the case of commercial fertilizers, they are not immediately used by the ground cover plants or able to be leached from the soil. They become available to the ground cover plants at just about the same time that any added chemical fertilizers have been used up or leached from the soil, that is, in about six months to one year's time. This timed release fertilizing action obviates any need for reapplying chemical fertilizer to the soil surface within the first year after applying the mint mulch product.

An alternative method of application of the mint mulch product is in dry form. Conventional broadcasting apparatus is used to apply the product in dry form. Agitation or stirring of the pellets in the broadcasting apparatus tends to promote their breaking into smaller pieces, for example, mostly one-half to one-inch long. This action tends to enhance the uniformity of distribution of the mint mulch product. Uniformity of distribution can be further enhanced by using a smaller sized pellet than that shown in FIGS. 7 and 8, for example, one-quarter inch pellets. When the broadcast pellets are wetted, by rainfall or irrigation, they quickly absorb moisture and swell. The pellets typically swell to three or four times their original size. As they swell, they begin to crumble apart and disperse laterally. With application of only a couple of inches of rainfall or irrigation water, the dry pellets are nearly completely dispersed within a matter of weeks. This method of application is preferred for very small areas of land not justifying the use of large equipment.

Having illustrated and described a preferred embodiment of a mint mulch product and a process for making such product, it should be apparent to those skilled in the art that the process and product can be varied or modified in arrangement and detail. We therefore claim as our invention all modifications and variations within the spirit and scope of the following claims.

We claim:

1. A method of making mint mulch for use in mulching the surface of bare soil to encourage the growth of ground cover thereon, the method comprising:
   drying mint slugs to a moisture content of about 15% to 20%;
   chopping the dried mint slugs to a fiber length of less than about one inch; and
   pelletizing the dried, chopped mint slugs to produce mint mulch pellets.

2. A method of making mint mulch from mint slugs comprising:
   drying the mint slugs;
   chopping the mint slugs;
   sifting the dried, chopped mint slugs to remove fine material and thereby produce a fraction of the mint slugs comprising predominantly fibrous material; and
   pelletizing said fraction of fibrous material to produce mint mulch pellets.

3. A method according to claims 1 or 2 including crumbling said pellets sufficiently to provide fractures for readily admitting water into the interior of the pellets.

4. A method according to claim 1 including steaming the mint slugs prior to the pelletizing step.

5. A method according to claim 1 in which the chopping step includes chopping the mint fibers to a range of lengths such that most of the fibers are more than about one-half inch long.

6. A method of making mint mulch from mint slugs comprising:
   drying the mint slugs to a moisture content of less than about 20%,
   chopping the mint slugs to produce a range of mint fiber lengths predominantly between one-half inch and one inch;
   sifting the dried, chopped mint slugs to remove fine materials of a screen size less than 40 mesh and thereby produce a mint slug fraction consisting essentially of fibrous mint mulch material; and
   compressing a portion of the material of said fraction into a breakable, water-permeable mass.

7. A mulch product for mulching bare soil surfaces to resist erosion and promote plant growth thereon, the product comprising the fibrous portions of mint slugs from which fine materials of less than 40-mesh dimensions have been removed; the fibers of said portions having a length of less than about 2 inches and being crimped to promote separability when wetted; said fibrous portions including quantities of nitrogen, potassium and phosphorus bound in the organic structure thereof for slow release during decomposition of the mulch product.

8. A mulch product according to claim 7 in which said fibrous portions include a natural tackifier which is released therefrom when wetted for application and adheres the fibers and particles of soil together when dry.

9. A mulch product according to claim 7 in which said fibrous portions are compressed into crumbly pellets.

10. A mulch product for application to a bare soil surface in either dry form or in a water slurry, the mulch product comprising substantially dry particles of a compressed mass of fibers of mint slugs, which particles when wetted and applied to the soil surface disperse to form a soil-retaining fibrous mat thereon; the fibers having a maximum length of about one inch, the particles having a maximum size in at least one dimension of about one-half inch.

11. A mulch product according to claim 10 in which said mass of fibers consists essentially of fibers having a length of at least 1/32 inch.

12. A mulch product according to claim 10 in which said particles are fractured so as to readily admit water into their interior.

13. A mulch product according to claim 10 having an N-P-K assay of about 3% nitrogen, 1% potassium and 4% phosphorus.

14. A mulch product according to claim 10 in which the particles include sufficient quantities of a tackifier that, when applied to a sloping soil surface and wetted, the fibers will stick to the soil.

15. A mulch product according to claim 14 in which the particles include less than about 5 to 6 pounds of an artificial tackifier per ton of mulch product.

16. A mint mulch product for application to a bare soil surface to form a soil-retaining fibrous mat thereon, the mulch product comprising a water slurry of mint slug fibrous material having a predominant fiber length of about ½ to 1½ inches, a dry N-P-K assay sufficient to provide plant nutrients for starting a ground cover on barren soil without applying additional such nutrients to the soil, and a sufficient quantity of natural tackifier that, in the absence of artificial tackifier, the fibrous material will adhere to the soil surface.

17. A mulch product for topical application to a bare soil surface to retard erosion and to promote the growth of a ground cover thereon comprising chopped stem portions of mint slugs.

* * * * *